United States Patent [19]

Suga et al.

[11] Patent Number: 5,164,454

[45] Date of Patent: Nov. 17, 1992

[54] ETHYLENE GRAFT COPOLYMER AND MOLDING RESIN COMPOSITION CONTAINING THE SAME

[75] Inventors: Katsufumi Suga; Yoshihiro Yoshinaga; Hiroaki Yoshitomi, all of Kanagawa; Takashi Tsuda, Aichi; Shiro Kojima, Tokyo; Kishiro Azuma, Aichi, all of Japan

[73] Assignees: Toagosei Chemical Industry Co., Ltd.; Nippon Petrochemicals Co., Ltd., both of Tokyo, Japan

[21] Appl. No.: 549,995

[22] Filed: Jul. 9, 1990

[30] Foreign Application Priority Data

| Jul. 7, 1989 | [JP] | Japan | 1-174282 |
| Jul. 20, 1989 | [JP] | Japan | 1-185920 |
| Aug. 10, 1989 | [JP] | Japan | 1-207219 |
| Dec. 27, 1989 | [JP] | Japan | 1-344442 |
| Dec. 28, 1989 | [JP] | Japan | 1-340677 |
| Feb. 23, 1990 | [JP] | Japan | 2-43731 |
| Feb. 23, 1990 | [JP] | Japan | 2-43732 |
| Feb. 26, 1990 | [JP] | Japan | 2-45161 |
| Feb. 27, 1990 | [JP] | Japan | 2-47054 |
| Mar. 23, 1990 | [JP] | Japan | 2-71888 |

[51] Int. Cl.$^5$ ............... C08F 257/02; C08F 283/12; C08L 51/00; C08L 67/00; C08L 69/00; C08L 77/00; C08L 81/04; C08L 71/08
[52] U.S. Cl. ............... 525/309; 525/279; 525/286; 525/288; 525/296; 525/324; 525/479; 525/64; 525/66; 525/67; 525/71; 525/87; 525/185; 525/446; 525/464
[58] Field of Search ............... 525/286, 288, 279, 296, 525/308, 309, 324, 479, 64, 66, 67, 71, 87, 185, 446, 464

[56] References Cited

U.S. PATENT DOCUMENTS

| 3,786,116 | 1/1974 | Milkovich et al. | 260/885 |
| 3,832,423 | 8/1974 | Milkovich et al. | 260/878 |
| 3,842,059 | 10/1974 | Milkovich et al. | 260/93.5 |
| 3,862,267 | 1/1975 | Milkovich et al. | 260/878 |
| 4,397,982 | 8/1983 | Boutni et al. | 524/493 |
| 4,554,316 | 11/1985 | Sakano et al. | 525/71 |
| 4,670,485 | 6/1987 | Hesse et al. | 525/187 |

*Primary Examiner*—James J. Seidleck
*Assistant Examiner*—Vasu S. Jagannathan
*Attorney, Agent, or Firm*—Sughrue, Mion, Zinn, Macpeak & Seas

[57] ABSTRACT

An ethylene graft copolymer is disclosed, which is obtained by radical polymerizing a monomer composition comprising (A) from 50 to 99.95% by weight of ethylene, (B) from 0.05 to 50% by weight of a macromonomer having a number average molecular weight of from 2,000 to 20,000 and having a (meth)acryloyl group only at one terminal of the molecular chain thereof, and (C) 0 to 49.95% by weight of other radical polymerizable monomer(s). The ethylene graft copolymer is a modifier for improving impact resistance of engineering plastics or a compatibilizer for engineering plastics to provide a molding resin composition excellent in impact resistance and oil resistance. The ethylene graft copolymer is also useful as a hot-melt adhesive or a pressure-sensitive adhesive.

3 Claims, No Drawings

ETHYLENE GRAFT COPOLYMER AND MOLDING RESIN COMPOSITION CONTAINING THE SAME

FIELD OF THE INVENTION

This invention relates to a novel ethylene graft copolymer and a molding resin composition containing the same.

BACKGROUND OF THE INVENTION

Processes for producing polyethylene are roughly divided into a high-pressure radical polymerization using a radical forming agent process and a high-, medium- or low-pressure ionic polymerization process using a Ziegler catalyst.

A high-pressure radical polymerization process generally produces low-density polyethylene having a density of from 0.91 to 0.935 g/cm$^3$, and a high-, medium- or low-pressure ionic polymerization process gives high-, medium- or low-density polyethylene having a density of from about 0.91 to 0.97 g/cm$^3$ by introducing an α-olefin as a copolymerizable monomer.

On comparing the structure and physical properties between the low-density polyethylene from high-pressure radical polymerization (hereinafter referred to as high-pressure-processed LDPE) and the low-density polyethylene from high-, medium- or low-pressure ionic polymerization (hereinafter referred to as LLDPE), there is an essential difference in molecular structure, though the densities are on the same level. That is, LLDPE has short-chain branches introduced by copolymerizing an α-olefin, applying an extended technique of the production of linear high-density polyethylene, to thereby reduce the density, whereas high-pressure-processed LDPE has its density reduced by long-chain branches produced by radical polymerization.

High-pressure-processed LDPE and LLDPE differ in physical properties resulting from the above-described structural difference and accordingly differ in application. In more detail, since high-pressure-processed LDPE has a relatively broad molecular weight distribution and long-chain branches, it is excellent in optical characteristics, such as gloss and transparency, and is therefore suitable for extrusion molding to produce films, etc. On the other hand, since LLDPE obtained by ionic polymerization has short-chain branches and a narrow molecular weight distribution, it becomes highly viscous when molded at a high shear rate by, for example, extrusion molding and is also inferior in optical characteristics to high-pressure-processed LDPE, but is suitable for injection molding and provides molded articles having a high melting point and excellent mechanical strength.

There has recently been a demand for high-pressure-processed LDPE resins with characteristics not possessed by the conventional polyethylene resins, for example, improved rigidity, printability, lubricity, and adhesiveness, in addition to the characteristics inherent to polyethylene.

Further, in the field of structural materials and automobile parts, etc., it has been demanded to endow polyamide, polyester, polyphenylene ether, ABS resins, polycarbonate, polyphenylene sulfide, and the like, which are typical engineering plastics, with improved resistance to impact, oils, and chemicals. To meet this demand, compounding of these engineering plastics with a polyethylene resin has been proposed in, for example, U.S. Pat. Nos. 4,397,982 and 4,554,316, but, as hereinafter described, none of conventional high-pressure-processed LDPE type polyethylene resins is miscible with the engineering plastics with good compatibility.

Typical techniques for modifying polyethylene include a process comprising graft polymerizing a vinyl monomer, e.g., acrylic acid, methacrylic acid (hereafter collectively referred to as "(meth)acrylic acid") or a derivative thereof and maleic anhydride, to polyethylene as disclosed, for example, in JP-B-39-6384 and JP-B-42-10727 (the term "JP-B" as used herein means an "examined and published Japanese patent application").

However, according to the above-described grafting process in which a graft monomer is radical polymerized in the presence of an ethylene homopolymer using an organic peroxide or radiation as a polymerization initiator (hereinafter called a general-purpose grafting process), homopolymerization of the graft monomer preferentially takes place only to produce a graft copolymer with short-chain branches at a low purity, having caused difficulty in greatly improving physical properties of polyethylene.

Besides the above-described modification process, high-pressure radical polymerization of an ethylene monomer and a polyalkylene glycol monoacrylate having a degree of condensation as low as 4 to 9 has been proposed as a process for producing modified high-pressure-processed LDPE as disclosed in JP-B-61-28685.

This process provides an ethylene random copolymer excellent in hydrophilic and antistatic properties. The random copolymer, however, carries short-chains derived from the polyalkylene glycol unit and is, therefore, limited in their use similarly to the graft copolymers obtained by the general-purpose grafting process. For example, it is barely satisfactory as a resin to be compounded into the engineering plastics or as a compatibilizer to be used in mixing or compounding polyethylene and the engineering plastics.

In the case of LLDPE, on the other hand, U.S. Pat. No. 3,786,116 suggests, as a means for modifying LLDPE, an ethylene graft copolymer obtained by polymerizing ethylene and a high-molecular-weight monomer having a molecular weight of from 5,000 to 50,000, called a macromonomer, which comprises polystyrene, poly-α-methylstyrene, etc. as a polymer skeleton with an α-olefinic double bond at the terminal thereof, in the presence of a Ziegler catalyst. The ethylene graft copolymer exhibits marked effects of modifying polyethylene even with a small proportion of the macromonomer and is useful as a compatibilizer, and the like.

Hence, it has been studied to apply the above-described copolymerization of a macromonomer and ethylene to the production of an ethylene graft copolymer comprising high-pressure-processed LDPE as a main chain and a macromonomer as a grafted component. However, it is generally received that radical polymerization of a macromonomer under such a high temperature and high pressure condition as in the synthesis of high-pressure-processed LDPE encounters extreme technical difficulty for the reasons set forth below. There is found no report in which a macromonomer and ethylene are random copolymerized under a high temperature and high pressure condition for the purpose of modifying high-pressure-processed LDPE.

When exposed to the above-described reaction condition, macromonomers, particularly those having polymethyl methacrylate or polystyrene as a polymer skeleton tend to undergo depolymerization or molecular cut-off. Should it occur, radical concentration in the polymerization system would abnormally increase, resulting in the failure of control of polymerization. Moreover, it appears that the macromonomer acts as a chain transfer agent so that a desired high-molecular polymer cannot be obtained.

SUMMARY OF THE INVENTION

An object of this invention is to provide an ethylene graft copolymer having rigidity, printability, and lubricity as well as characteristics essential to high-pressure-processed LDPE.

Another object of this invention is to provide a molding resin composition comprising such an ethylene graft copolymer and an engineering plastic selected from polyamide, polyester, polyphenylene ether, an ABS resin, polycarbonate, or polyphenylene sulfide.

As a result of extensive investigations, the inventors have found that ethylene and a specific macromonomer can be copolymerized under a high temperature and high pressure condition as in the production of high-pressure-processed LDPE without being accompanied by vigorous and abnormal polymerization. The inventors have also found that a macromonomer having an acryloyl or methacryloyl (collectively referred to as "(meth)acryloyl") group only at one terminal of the molecular chain thereof is greatly superior to macromonomers having other radical polymerizable group, e.g., a styryl group, in copolymerizability with ethylene under a high temperature and high pressure condition. It has further been found that the ethylene graft copolymer obtained by copolymerization of such a macromonomer and ethylene exhibits rigidity, printability or lubricity, as well as basic properties of high-pressure-processed LDPE, and further exhibits excellent compatibility with a resin selected from the group consisting of polyamide, polyester, polyphenylene ether, an ABS resin, polycarbonate, and polyphenylene sulfide. The present invention has been completed based on these findings.

The present invention relates to an ethylene graft copolymer which is obtained by radical polymerizing a monomer composition comprising (A) from 50 to 99.95% by weight of ethylene, (B) from 0.05 to 50% by weight of a macromonomer having a number average molecular weight of from 2,000 to 20,000 and having a (meth)acryloyl group only at one terminal of the molecular chain thereof, and (C) 0 to 49.95% by weight of other radical polymerizable monomer(s).

In a preferred embodiment of the invention, the radical polymerization is carried out at a temperature of from 50° to 400° C. and at a pressure of from 500 to 4,000 kg/cm$^2$.

In another preferred embodiment of the invention, the ethylene graft copolymer has a melt index of from 0.01 to 500 g/10-min and a molecular weight distribution Mw/Mn of from 1.0 to 20.0.

The present invention further relates to a molding resin composition comprising the above-described ethylene graft copolymer and a resin selected from the group consisting of polyamide, polyester, polyphenylene ether, an ABS resin, polycarbonate, and polyphenylene sulfide.

DETAILED DESCRIPTION OF THE INVENTION

The macromonomer which can be used in the present invention carries a (meth)acryloyl group only at one terminal of the molecular chain thereof and has a number average molecular weight of from 2,000 to 20,000, preferably from 3,000 to 15,000. The polymer moiety (polymer skeleton) of the macromonomer is selected appropriately depending on the purpose from among, for example, polystyrene, a styrene-acrylonitrile copolymer, polymethyl methacrylate, polyethyl methacrylate, polybutyl methacrylate, a copolymer of an alkyl methacrylate and other vinyl monomers, and silicone.

If the number average molecular weight of the macromonomer is less than 2,000, the resulting ethylene graft copolymer has short-chain branches and an insufficient function as a compatibilizer. If it exceeds 20,000, the macromonomer has poor copolymerizability with ethylene and cannot be introduced into the graft copolymer in a desired proportion.

The number average molecular weight of macromonomers can be determined by gel-permeation chromatography (GPC) using polystyrene as a standard.

Macromonomers can be synthesized by processes classified into a radical polymerization process and an anionic polymerization process according to the manner of polymerization for the formation of the polymer skeleton thereof. The anionic polymerization process is further classified into an anionic living polymerization-end cap process and a group transfer process. A proper choice is made from these processes depending on the kind of the monomer constituting the polymer skeleton.

For the synthesis of macromonomers having a styrene unit as a polymer skeleton (hereinafter referred to as "polystyrene type macromonomer"), either anionic living polymerization-end cap process or radical polymerization process is employable.

According to an anionic living polymerization-end cap process as described in U.S. Pat. No. 3,786,116, for example, styrene is allowed to grow to a prescribed molecular weight by anionic living polymerization and then reacted with ethylene oxide to terminate the polymerization. Thereafter, the resulting polymer is reacted with methacryl chloride to obtain a polystyrene type macromonomer having a methacryloyl group at one terminal thereof.

According to a radical polymerization process, styrene is radical polymerized using a mercaptan compound having a functional group reactive with an epoxy group, e.g., a carboxyl group, and a mercapto group as a chain transfer agent to obtain polystyrene having the functional group at one terminal thereof, and the resulting polystyrene and a compound having an epoxy group and a (meth)acryloyl group per molecule are subjected to addition reaction to obtain a polystyrene type macromonomer. Reference can be made to JP-A-63-101462 (the term "JP-A" as used herein means an "unexamined published Japanese patent application").

The mercaptan compound having an epoxy-reactive functional group and a mercapto group which can be used in the radical polymerization process includes mercaptoacetic acid, mercaptopropionic acid, and 2-aminoethanethiol. The compound having an epoxy group and a (meth)acryloyl group includes glycidyl methacrylate and glycidyl acrylate.

Examples of monomers constituting the polystyrene type macromonomer include styrene, aromatic substituted styrenes, i.e., having a substituted phenyl ring, such as methyl-styrene, isopropylstyrene and chlorostyrene, and α-substituted styrenes such as α-methylstyrene and α-ethylstyrene. Other vinyl monomers may also be copolymerized with the above styrene monomer in an amount of 40 mol % or less, preferably not more than 20 mol %, based on the total amount of monomer components of the macromonomer to thereby form macromonomers having a copolymer skeleton, and examples include alkyl (meth)acrylates, (meth)acrylonitrile, vinyl acetate, vinyl chloride, maleic anhydride, (meth)acrylic acid, and the like.

Macromonomers having an alkyl (meth)acrylate unit in its polymer skeleton can be synthesized in the same manner as described for polystyrene type macromonomers. Macromonomers having polyalkyl methacrylate as a polymer skeleton (hereinafter referred to as "polyalkyl methacrylate type macromonomer") may also be synthesized easily by a group transfer polymerization process as described in JP-A-58-13603.

Using mercaptoethanol as a chain transfer agent in the same manner as in the radical polymerization of polystyrene type macromonomers, the macromonomer can also be obtained as described in U.S. Pat. No. 3,689,593, wherein a polymer having a hydroxy group at one terminal thereof is prepared under the same reaction condition as that in the synthesis of the above-described polymer having a carboxyl group at one terminal thereof, and then the hydroxy group of the polymer is converted into a isocyanato group by reacting with toluene diisocyanate, followed by the reaction with 2-hydroxyethyl methacrylate.

A (meth)acryloyl group can also be introduced at one terminal of polymers by radical polymerization in the presence of a charge transfer agent such as thioglycollic acid in JP-A-60-92344.

Alkyl (meth)acrylates used in preparation of the polyalkyl methacrylate type macromonomers generally have the alkyl moiety of 1 to 18 carbon atoms and preferably 1 to 8 carbon atoms, and examples include methyl (meth)acrylate, ethyl (meth)acrylate, propyl (meth)acrylate, n-butyl (meth)acrylate, t-butyl (meth)acrylate, hexyl (meth)acrylate, cyclohexyl (meth)acrylate, n-octyl (meth)acrylate, and 2-ethylhexyl (meth)acrylate. These monomers may be used either individually or in combination of two or more thereof.

The alkyl (meth)acrylate monomer may be used in combination with other vinyl monomers, e.g., ethylene, (meth)acrylamide, (meth)acrylonitrile, vinyl acetate, vinyl chloride, maleic anhydride, (meth)acrylic acid, and a styrene derivative (e.g., methylstyrene, chlorostyrene, and α-methylstyrene). The other vinyl monomer may be copolymerized in an amount of 40 mol % or less and preferably not more than 20 mol %.

Macromonomers having silicone as a polymer skeleton (hereinafter referred to as silicone type macromonomers) can be synthesized typically by subjecting a cyclic siloxane, etc. to anionic living polymerization by using a known anionic polymerization initiator, e.g., hydroxides, alkoxides or silanolates of alkali metals, and terminating the polymerization reaction by using a compound having a radical polymerizable group.

Silicone type macromonomers may also be obtained by condensing a hydroxyl-terminated silicone compound with an acrylic compound, e.g., γ-(meth)acryloxypropyltrichlorosilane, γ-(meth)acryloxypropylmethyldichlorosilane, γ-(meth)acryloxy-propyldimethylchlorosilane, γ-(meth)acryloxypropyltrimethoxysilane, and γ-(meth)acryloxypropyltriethoxysilane.

Examples of suitable cyclic siloxane compounds which can be used in the synthesis of the silicone type macromonomers include hexamethylcyclotrisiloxane, octamethyltetrasiloxane, hexaethylcyclotrisiloxane, octaethyltetrasiloxane, hexaphenylcyclotrisiloxane, and octaphenyltetrasiloxane. Reference can be made to JP-A-58-154766, JP-A-59-20360, and JP-A-59-126478.

In the present invention, ethylene (A) and the above-described macromonomer (B) may be copolymerized with other radical copolymerizable monomers (C).

Examples of usable radical copolymerizable monomers include vinyl esters, e.g., vinyl acetate, vinyl propionate, and vinyl benzoate; unsaturated carboxylic acids, e.g., (meth)acrylic acid, maleic acid, maleic anhydride, itaconic acid, fumaric acid, and maleic monoesters; alkyl (meth)acrylates, e.g., methyl (meth)acrylate, ethyl (meth)acrylate, propyl (meth)acrylate, n-butyl (meth)acrylate, isobutyl (meth)acrylate, t-butyl (meth)acrylate, n-hexyl (meth)acrylate, n-heptyl (meth)acrylate, n-octyl (meth)acrylate, 2-ethylhexyl (meth)acrylate, and n-decyl (meth)acrylate; styrene and its derivatives; vinyl aromatic compounds, e.g., vinylpyridine and vinylnaphthalene; N-vinyl compounds, e.g., N-vinylpyrrolidone and N-vinylcaprolactam; vinyl ethers, e.g., vinyl methyl ether and vinyl ethyl ether; glycidyl (meth)acrylate, (meth)acrylamide, (meth)acrylonitrile, vinyl chloride, and carbon monoxide. These monomers may be used either individually or in combination of two or more thereof.

The ethylene graft copolymer according to the present invention is obtained by radical copolymerizing a monomer composition comprising (A) from 50 to 99.95% by weight, preferably 80% by weight or more, of ethylene, (B) from 0.05 to 50% by weight of the above-described macromonomer and, if desired, (C) up to 49.9% by weight of other radical polymerizable monomers, based on the total monomer composition.

If the composition ratio of the macromonomer is less than 0.05% by weight, the resulting ethylene graft copolymer does not exhibit physical properties assigned to the macromonomer. If the composition ratio of ethylene is less than 50% by weight, the characteristics inherent to high-pressure-processed LDPE cannot be manifested.

The radical polymerization of the monomers (A), (B), and (C) is preferably carried out at a temperature of from 50° to 400° C. and at a pressure of from 500 to 4,000 kg/cm$^2$, more preferably at a temperature of from 100° to 350° C. and at a pressure of from 1,000 to 3,500 kg/cm$^2$.

Polymerization initiators which can be used in the present invention include peroxides, hydroperoxids, azo compounds, amine oxides, and molecular oxygen. The polymerization initiator is preferably used in an amount of from 0.0001 to 1% by weight based on the total monomer composition.

The radical polymerization is preferably effected in the presence of a chain transfer agent generally employed in homopolymerization of ethylene. Examples of suitable chain transfer agents are hydrogen, methane, ethane, propane, propylene, butane, iso-butane, butene-1, n-hexane, n-heptane, cycloparaffins, chloroform, carbon tetrachloride, methanol, ethanol, propanol, isopropanol, carbon dioxide, acetone, methyl ethyl ketone, toluene, diethylbenzene, and xylene. Preferred of them are lower saturated aliphatic hydrocarbons having from about 4 to 10 carbon atoms.

The polymerization reaction can be effected according to conventional high-pressure radical polymerization of ethylene, for example, by bringing the monomer components into contact with each other at once or stepwise in an autoclave reactor or a tubular reactor. In the polymerization reaction, all the monomer components in the monomer composition need not be consumed for the production of ethylene graft copolymers, and polymerization conversion of ethylene is more or less on the same level as in conventional high-pressure radical polymerization of ethylene.

The macromonomer is preferably fed to a polymerization system in the form of a low-viscosity solution having a low concentration of 50% by weight or less in an organic solvent in a continuous manner from a hydraulic intensifier. The organic solvent to be used for dissolving the macromonomer preferably has a small chain transfer constant ($C_s$) so that the resulting ethylene graft copolymer does not have a small molecular weight. More specifically, organic solvents having a $C_s$ of not more than $6 \times 10^{-2}$ at 130° C., such as toluene, acetone, methyl ethyl ketone, and ethyl acetate, are preferred. In view of solubility of the macromonomer and low viscosity of the resulting macromonomer solution, toluene and acetone are more preferred.

From the standpoint of processability, the ethylene graft copolymer thus obtained preferably has a melt index (measured at 190° C. under a load of 2.16 kg in accordance with JIS K6760) of from 0.01 to 500 g/10-min, and preferably from 0.1 to 100 g/10-min. The molecular weight distribution Mw/Mn of the ethylene graft copolymer preferably ranges from 1.0 to 20.0.

The ethylene graft copolymer of the present invention has the trunk portion composed of the unit of high-pressure-processed LDPE and the branch portions composed of the polymer moiety (polymer skeleton) of the macromonomer. In the present invention, the ethylene graft copolymer can be produced at markedly high grafting efficiency with little by-products as compared to conventional process of producing ethylene graft copolymers, and therefore they not only exhibit properties of high-pressure-processed polyethylene but also have unique functions. Further, they can be used for various purposes by properly selecting the kind and molecular weight of the macromonomer.

The etylene graft copolymer of the present invention has an excellent anchor effect due to the long-chain branch portions so that it can stabilize the interface of polymer blends and accelerate microscopic dispersion of the polymer blends, and thus it contributes to development of new polymer composites.

In particular, the ethylene graft copolymer can be compounded as a compatibilizing agent with polyamides, polyesters, polyphenylene ethers, ABS resins, polycarbonate resins, polyphenylene sulfides or the like to improve various properties such as impact resistance, oil resistance, moldability, resistance to water absorption, ductility and tensile strength, without deterioration of their properties, and the compounded resin composition can be used as a molding resin composition for industrial parts, mechanical parts, automobile parts and electrical and electronic parts.

Examples of suitable polyamide with which the ethylene graft copolymer of the present invention is compounded include polyhexamethylene adipamide, polycaprolactam, polyundecanolactam, polydodecanolactam, polyhexamethylene sebacamide, polylpyrrolidone, polyheptolactam, polycaprilactam, polynonanolactam, polyhexamethylene azelainamide, polyhexamethylene isophthalamide, poly-m-xylylene adipamide, polyamide of hexamethylenediamine and n-dodecanedicarboxylic acid, polyamide of dodecamethylenediamine and n-dodecanedicarboxylic acid, and copolyamides comprising two or more of monomers constituting these polyamides. Preferred are polycaprolactam (hereinafter referred to as nylon-6) and polyhexamethylene adipamide.

In addition, block copolymers comprising a polyamide unit and other polymer unit, e.g., polyether, polyester and polyvinyl, and polyamide-imide (containing an amide linkage and an imide linkage per molecular skeleton) are also useful.

Examples of suitable polyester which can be compounded with the ethylene graft copolymer of the invention include polyethylene terephthalate, polypropylene terephthalate, polybutylene terephthalate, polyhexamethylene terephthalate, a polycondensate of terephthalic acid and bisphenol A (generally called polyarylate), poly(p-hydroxybenzoic acid) (generally a kind of liquid crystal polyesters), and co-polycondensates thereof. Of these, polyethylene terephthalate and polybutylene terephthalate are preferred.

Examples of suitable polyphenylene ether which can be compounded with the ethylene graft copolymer of the invention include those having the following structure, which can be prepared by reacting a phenol compound with oxygen in the presence of a copper complex catalyst as described in many literatures, e.g., U.S. Pat. Nos. 3,306,874 and 3,306,875.

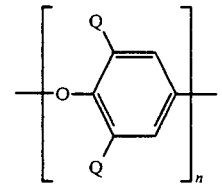

wherein the ether oxygen per unit is connected to a phenyl nucleus of the next unit; n represents a positive integer of at least 50; Q may be the same or different and each represents a hydrogen atom, a halogen atom, a hydrocarbon group having no tertiary carbon atom at the α-position, a halogenated hydrocarbon group having at least two carbon atoms between the halogen atom and the phenyl nucleus, or an alkoxy group, with the above-described hydrocarbon, halogenated hydrocarbon and alkoxy group preferably having up to 4 carbon atoms.

Preferred of them are those wherein Q is an alkyl group, and more preferred are those wherein Q is an alkyl group having from 1 to 4 carbon atoms. The most preferred polyphenylene ether is poly(2,6-dimethyl-1,4-phenylene) ether.

The polyphenylene ether may be a polymer alloy with a polystyrene based resin or may contain an appropriate amount of a block copolymer, e.g., a styrene-butadiene block copolymer or a rubbery like resin, e.g., an ethylene-vinyl acetate copolymer, an ethylene-propylene-diene terpolymer, an ethylene-ethyl acrylate copolymer, and a styrene-butadiene random copolymer.

The ABS resins with which the ethylene graft copolymer of the invention can be compounded are molding thermoplastic resins obtained by radical graft polymerization of a vinyl monomer mixture mainly comprising styrene and acrylonitrile in the presence of a rubbery polymer. Included in usable ABS resins are not only those of the narrow sense of the term, i.e., those wherein the rubbery polymer is polybutadiene, a styrene-butadiene copolymer or an acrylonitrile-butadiene copolymer, but also those of the broad sense of the term generally called ABS resins, AES resins, ACS resins and AAS resins, i.e., those wherein the rubbery polymer is a diene rubber, e.g., polyisoprene and polychloroprene; an olefin rubber, e.g., an ethylene-propylene copolymer, an ethylene-propylene-diene terpolymer, chlorinated polyethylene, and polyisobutylene; or an acrylic rubber mainly comprising an alkyl (meth)acrylate. Preferred of them are ABS resins wherein the rubbery polymer is a diene rubber.

Vinyl monomers to be grafted to the rubbery polymer to prepare ABS resins mainly comprise styrene and acrylonitrile, preferably from 50 to 90% by weight of styrene and from 10 to 40% by weight of acrylonitrile, and more preferably from 60 to 85% by weight of styrene and from 15 to 35% by weight of acrylonitrile, based on the total vinyl monomers. If desired, other vinyl monomers, e.g., α-methylstyrene, aromatic substituted styrenes, (meth)acrylic esters, methacrylonitrile, (meth)acrylic acid, maleic anhydride, and phenylmaleimide, may be used in combination in a proportion of up to 20% by weight.

A preferred proportion of the rubbery polymer in the ABS resins is from 5 to 40% by weight, and more preferably from 10 to 30% by weight.

Graft polymerization for obtaining ABS resins can be carried out by emulsion polymerization, suspension polymerization, bulk polymerization, or solution polymerization, or an appropriate combination thereof.

The ABS resins may contain an appropriate amount of resins other than the graft copolymer obtained by graft polymerization of styrene and acrylonitrile to the rubbery polymer. Examples of usable other resins include a styrene-butadiene block copolymer or a hydrogenation product thereof, polybutadiene, a styrene-butadiene copolymer, an acrylonitrile-butadiene copolymer, polyisoprene, polychloroprene, an ethylene-propylene copolymer, an ethylene-propylene-diene terpolymer, chlorinated polyethylene, polyisobutylene, acrylic rubbers mainly comprising an alkyl (meth)acrylate, and polyurethane. The content of these other resins in the ABS resin is preferably not more than 30% by weight.

The polycarbonate with which the ethylene graft copolymer of the invention can be compounded is aromatic polycarbonate represented by formula:

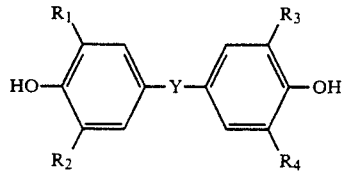

wherein $R_1$, $R_2$, $R_3$, and $R_4$, which may be the same or different, each represents a hydrogen atom, a lower alkyl group preferably having 1 to 4 carbon atoms, or a halogen atom; and Y represents a linking group, e.g., an alkylene group preferably having 1 to 4 carbon atoms, an ether linkage (—O—), a thioether linkage

and a sulfone linkage (—S—), whose main unit comprises a residue of a dihydric phenol represented by formula:

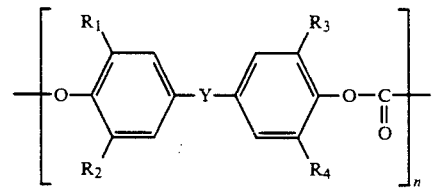

wherein $R_1$, $R_2$, $R_3$, $R_4$, and Y are as defined above.

Such polycarbonate can be synthesized by a reaction between the above-described dihydric phenol and phosgene or an interesterification reaction between the dihydric phenol and diphenyl carbonate.

Examples of suitable dihydric phenols are 2,2-bis(4-hydroxyphenyl)propane, 2,2-(4-hydroxyphenyl)methane, 4,4'-dihydroxydiphenyl thioether, 4,4-dihydroxydiphenyl sulfone, 4,4'-dihydroxydiphenyl ether, 2,2-bis(3,5-dibromo-4-hydroxyphenyl)propane, 2,2-bis(3,5-dichloro-4-hydroxyphenyl)propane, and 2,2-bis(3,5-dimethyl-4-hydroxyphenyl)propane.

Preferred of these polycarbonate resins are those obtained by using 2,2-bis(4-hydroxyphenyl)propane whose phenyl group may be substituted with a halogen atom.

The polyphenylene sulfide with which the ethylene graft copolymer of the invention can be compounded is a polymer containing at least 70 mol %, preferably at least 90 mol %, of a repeating unit represented by formula:

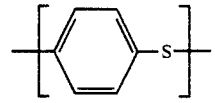

Polymers containing less than 70 mol % of the repeating unit fail to exhibit properties attributed to the unit, that is, the physical properties inherent to polyphenylene sulfide.

Copolymerizable units which may constitute polyphenylene sulfide in combination with the above-described repeating unit include those represented by formula:

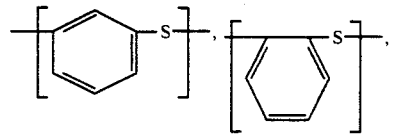

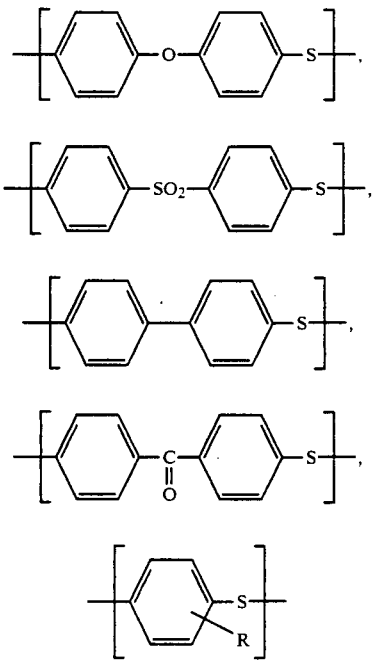

wherein R represents an alkyl group preferably having 1 to 4 atoms, a nitro group, a phenyl group, an alkoxy group preferably having 1 to 4 atoms, a carboxyl group, or a metal salt of a carboxyl group.

The copolyphenylene sulfide containing these copolymerizable units in addition to the above-described repeating unit may be either a random copolymer or a block copolymer.

The polyphenylene sulfide can be obtained, for example, by reacting sodium sulfide and p-dichlorobenzene in an amide type solvent, e.g., N-vinylpyrrolidone and dimethylacetamide, or a sulfone type solvent, e.g., sulfolane.

To control the degree of polymerization, it is preferable to add an adequate amount of an alkali metal carboxylate, e.g., sodium acetate and lithium acetate, to the polymerization system.

The melt viscosity of the resulting polyphenylene sulfide is not particularly limited as long as it is suited for obtaining molded articles. A suitable melt viscosity is from 100 to 10,000 poise.

While the ethylene graft copolymer of the present invention per se is effectively used for production of molded products, films, or as a covering agent, a hot-melt adhesive or a pressure-sensitive adhesive, it is preferably used as an additive for the above-described engineering plastics. The kind of the ethylene graft copolymer which can be added to those engineering plastics is selected depending on the kind of the engineering plastic. For example, it is preferable to combine an ethylene graft copolymer which is obtained by radical polymerization of ethylene, the macromonomer, and acrylic acid, methacrylic acid or a glycidyl esther thereof, with polyamide, polyester, polycarbonate, or polyphenylene sulfide. Such an ethylene graft copolymer has excellent affinity for polyamide, polyester, polycarbonate or polyphenylene sulfide owing to reactivity of the carboxyl group or epoxy group present in the main chain thereof and thus provides a resin composition in which resin components exhibit satisfactory miscibility with each other.

In the above-described combination, it is preferable to mix from 0.1 to 50% by weight, preferably from 0.5 to 30% by weight, of the ethylene graft copolymer and from 50 to 99.9% by weight of polyamide, polyester, polycarbonate or polyphenylene sulfide based on the total resin composition.

Various additives such as a stabilizer, a pigment, a filler, a crosslinking agent, a foaming agent, an antistatic agent, and a flame retardant may be added in the ethylene graft copolymer or the above-described resin compositions, which can be molded into a desired shape in a conventional manner for example, by melt-kneading with an extruder, a kneader, an open roll, etc., preferably a Henschel mixer, pelletizing with an extruder, and then subjecting to injection molding, press molding, extrusion molding, blow molding or the like.

The thus molded product has improved physical properties, such as oil resistance, chemical resistance, and impact resistance and is suitable for use as automobile parts, electrical or electronic parts, and structural materials.

While the above-specified ethylene graft copolymer having a carboxyl group or an epoxy group in the main chain thereof are preferably added to polyamide or polyester, those having the branch component comprising a monomer unit having a tertiary alkyl ester group is more preferred to be combined with polyamide or polyester. Such an ethylene graft copolymer can be obtained, for example, by radical polymerization of a macromonomer obtained by polymerizing a monomer having a tertiary alkyl ester group, e.g., t-butyl (meth)acrylate and 1,1-dimethylpropyl (meth)acrylate, either alone or in combination with other vinyl monomer(s), ethylene, and, if desired, other radical polymerizable monomers under high pressure.

A preferred proportion of the monomer unit having a tertiary alkyl ester group in the macromonomer is 20% by weight or more. If it is less than 20% by weight, the resulting ethylene graft copolymer tends to exhibit insufficient compatibility with polyamide or polyester.

A monomer composition subject to radical polymerization preferably comprises from 0.1 to 50% by weight of the macromonomer containing a tertiary alkyl ester group,, from 50 to 99.9% by weight of ethylene, and 0 to 40% by weight of other radical polymerizable monomers, more preferably from 1 to 40% by weight of the macromonomer, from 60 to 99% by weight of ethylene, and 0 to 30% by weight of other monomers. If the composition ratio of the macromonomer is less than 0.1% by weight, the content of the branch component in the resulting ethylene graft copolymer is too low for the effects of grafting to be exerted. On the other hand, if it exceeds 50% by weight, the polymerization system is ready to undergo gelation. If the composition ratio of other radical polymerizable monomers exceed 40% by weight, the resulting ethylene graft copolymer has a low relative ethylene content and, as a result, loses physical properties attributed to the polyethylene unit, such as chemical resistance.

The amount of the ethylene graft copolymer having a tertiary alkyl ester group in the branch component thereof to be added to polyester or polyamide ranges from 12 to 40% by weight based on the total of the polyester or polyamide and the ethylene graft copolymer (two-component system composition). If the graft copolymer content in the two-component system composition exceeds 40% by weight, application of the resin composition is limited. For example, such a resin composition is unsuitable for use as an engineering plastic. If the graft copolymer content is less than 12% by weight, water resistance and impact resistance of the resulting resin composition are behind satisfaction.

A resin composition comprising the above-specified ethylene graft copolymer and polyamide or polyester is melt-kneaded in an extruder, a kneader, an open roll, etc. at a temperature of from about 200° to 300° C. and molded into a desired shape. During the melt-kneading of the above-described ethylene graft copolymer having a tertiary alkyl ester group, the tertiary alkyl ester group in the ethylene graft copolymer undergoes thermal decomposition to release an alkene compound and, at the same time, affords a carboxyl group to the graft copolymer. The thus released carboxyl group reacts with an amino group or a hydroxyl group present in the molecular terminal of the polyamide or polyester, thereby serving to compatibilize the graft copolymer with the polyamide or polyester.

If the kneading temperature of the resin composition is lower than 200° C., formation of a carboxyl group would be insufficient. If it exceeds 300° C., the resin composition easily suffers thermal deterioration.

The resin composition comprising either polyamide or polyester and the above-described ethylene graft copolymer has improved impact resistance, improved dimensional stability, and improved water resistance while retaining tensile strength or other physical properties on levels for practical use.

To be combined with polyphenylene ether, an ethylene graft copolymer obtained from a polystyrene type macromonomer whose polymer skeleton mainly comprises a styrene monomer unit is suitable. The amount of such an ethylene graft copolymer to be added to polyphenylene ether ranges from 2 to 80% by weight, and more preferably from 5 to 60% by weight, based on the total resin composition.

The proportion of a styrene monomer unit in the polymer skeleton of the above-described polystyrene type macromonomer, i.e., a styrene monomer unit in the branch component of the resulting ethylene graft copolymer is preferably at least 80% by weight. If it is less than 80% by weight, the branch component has insufficient compatibility with polyphenylene ether.

The above-specified ethylene graft copolymer which is preferably compounded with polyphenylene ether is preferably obtained by high-pressure radical polymerization of a monomer composition comprising from 0.1 to 50% by weight, more preferably from 1 to 50% by weight, of the polystyrene type macromonomer, from 50 to 99.9% by weight, more preferably from 50 to 99% by weight, of ethylene, and, if desired, up to 40% by weight, more preferably up to 30% by weight, of other radical polymerizable vinyl monomers.

To be combined with an ABS resin, an ethylene graft copolymer obtained from a macromonomer whose polymer skeleton comprises a polymer mainly comprising an alkyl methacrylate monomer unit or a styrene-acrylonitrile copolymer is suitable. Such an ethylene graft copolymer is preferably added to an ABS resin in an amount of from 2 to 80% by weight, and preferably from 5 to 60% by weight, based on the total resin composition. When it is less than 2% by weight, oil resistance and chemical resistance cannot be improved in the case of the two-component resin composition and objective modification of the ABS resin cannot be attained, and a molded product of uniformly mixed components cannot be obtained in the case of resin compositions containing three or more components (e.g., the ABS resin, the ethylene graft copolymer and a polyolefin).

Where the macromonomer whose polymer skeleton comprises a polymer mainly comprising a methyl methacrylate monomer unit is used, the proportion of the methyl methacrylate monomer unit in the polymer skeleton is preferably 80 by weight. If it is less than 80% by weight, the branch component in the resulting ethylene graft copolymer has poor compatibility with an ABS resin.

Where the macromonomer whose polymer skeleton comprises a styrene-acrylonitrile copolymer is used, the total proportion of a styrene monomer unit and an acrylonitrile monomer unit in the styrene-acrylonitrile copolymer is preferably 90% by weight or more based on the total monomer units constituting the polymer skeleton. A preferred ratio of styrene monomer unit to acrylonitrile monomer unit is from 60/40 to 90/10 by weight. Outside this range, the branch component in the resulting ethylene graft copolymer has poor compatibility with an ABS resin.

The above-specified ethylene graft copolymer which can be preferably added to an ABS resin can be preferably obtained by high-pressure radical polymerization of a monomer composition comprising from 0.1 to 50% by weight, more preferably from 1 to 50% by weight, of the macromonomer, from 50 to 99.9% by weight, more preferably from 50 to 99% by weight, of ethylene, and, if desired, up to 40% by weight, preferably 0 to 30% by weight, of other vinyl monomers.

While the molding resin composition according to the present invention has been described with respect to two-component systems, the present invention also embraces three-component system resin compositions obtained by displacing a part of the ethylene graft copolymer in these two-component system compositions with other ethylene polymers.

Examples of other ethylene polymers which can be used in the molding resin composition of the present invention include various ethylene homopolymers and copolymers, e.g., high-pressure-processed polyethylene, medium-pressure-processed polyethylene, linear low-density polyethylene (LLDPE), very low-density polyethylene (VLDPE), an ethylene-propylene copolymer, an ethylene-propylene-diene terpolymer, an ethylene-vinyl acetate copolymer, an ethylene-(meth)acrylic acid (or ester) copolymer, and an ethylene-(meth)acrylic acid metal salt copolymer. Preferred among them are linear low-density polyethylene, very low-density polyethylene, an ethylene-propylene copolymer, and an ethylene-propylene-diene terpolymer.

In three-component system resin compositions, too, the kind of the ethylene graft copolymer to be used is selected according to the kind of the engineering plastic to be combined as described above.

That is, a polyamide or polyester based three-component system resin composition preferably comprises from 5 to 95% by weight, more preferably from 60 to 95% by weight, of polyamide or polyester, from 0.1 to 10% by weight of an ethylene graft copolymer having a tertiary alkyl ester group in the branch component thereof, and from 5 to 95% by weight, preferably from 5 to 40% by weight, of other ethylene polymer. In this three-component system composition, if the content of the ethylene graft copolymer is less than 0.1% by weight, the compatibilizing effect of the graft copolymer on polyamide or polyester and other ethylene polymer is insufficient.

An ABS resin or polyphenylene ether based three-component system resin composition may contain up to 60% by weight of other ethylene polymers based on the total composition.

Heat resistance of the two- or three-component system resin compositions of the present invention can be improved by addition of inorganic fillers. A suitable amount of inorganic fillers to be added is 200 parts by weight or less per 100 parts by weight of the total resin components.

Various inorganic fillers in various shapes, e.g., powders, fibers, flakes, etc. are employable, including calcium sulfate, calcium silicate, clay, diatomaceous earth, talc, alumina, silica sand, silica, carbon black, glass powder, glass fiber, carbon fiber, silicon nitride, aluminum flakes, mica, and graphite.

If desired, the compositions of the present invention may further contain other additives, such as organic flame retardants, antioxidants, ultraviolet absorbents, lubricants, dispersing agents, and colorants, as described above.

Besides being useful as a modifier or a compatibilizer for improving impact resistance of the above-described engineering plastics, the ethylene graft copolymer according to the present invention is suitable for use as a hot-melt adhesive or a pressure-sensitive adhesive.

In more detail, an ethylene graft copolymer comprising (i) from 30 to 90% by weight, preferably from 40 to 70% by weight, of ethylene unit (ii), from 5 to 50% by weight, preferably from 10 to 40% by weight, of a macromonomer unit having a glass transition temperature (Tg) of not lower than 20° C., and (iii) 0 to 40% by weight of other radical polymerizable monomer unit(s) which may include an alkyl acrylate unit having from 2 to 14 carbon atoms in the alkyl moiety thereof in an amount of not more than 15% by weight based on the total monomer units constituting the ethylene graft copolymer, serves as a hot-melt adhesive suitable for adhering polyolefins, e.g., polyethylene and polypropylene, with other materials. Such as ethylene graft copolymer can be easily obtained by controlling a composition ratio of the above-described monomer composition upon radical polymerization.

In the above-described specific ethylene graft copolymer, if the ethylene monomer unit content is less than 30% by weight, adhesiveness to a polyolefin adherend is reduced. If it exceeds 90% by weight, adhesiveness to resins other than polyolefins is reduced. If the macromonomer unit content is less than 5% by weight, the proportion of the branch component in the graft copolymer is too small for the graft copolymer to exhibit sufficient adhesion to resins other than polyolefins. If it exceeds 50% by weight, the relative proportion of the ethylene unit becomes short to impair adhesion to polyolefins.

The ethylene graft copolymer for use as a hot-melt adhesive preferably contains a rigid polymer as a branch component thereof from the viewpoint of adhesion strength. In this connection, the macromonomer forming the branch component preferably comprises a polymer having a Tg of 20° C. or higher as a polymer skeleton thereof. Monomers which constitute the polymer skeleton of macromonomers having a Tg of 20° C. or higher include styrene monomers, e.g., styrene, α-methylstyrene, and chlorostyrene; (meth)acrylates, e.g., methyl methacrylate, ethyl methacrylate, propyl methacrylate, isopropyl methacrylate, butyl methacrylate, isobutyl methacrylate, t-butyl methacrylate, 2-ethylhexyl methacrylate, decyl methacrylate, lauryl methacrylate, stearyl methacrylate, and cyclohexyl methacrylate; vinyl esters, e.g., vinyl acetate and vinyl propionate; and unsaturated nitrile compounds, e.g., acrylonitrile and methacrylonitrile. Alkyl acrylate monomers having from 2 to 14 carbon atoms in the alkyl moiety thereof which provide polymers having a Tg of lower than 20° C. may also be used in combination with the above-enumerated monomers unless the resulting copolymer has a Tg lower than 20° C.

More preferred macromonomers are those in which the polymer skeleton thereof has a Tg of 50° C. or higher, specifically including polystyrene type macromonomers, polymethyl methacrylate type macromonomers, and copoly(acrylonitrile/styrene) type macromonomers.

For the purpose of increasing adhesion to an adherend, carboxyl-containing monomers, e.g., acrylic acid, methacrylic acid, maleic acid, maleic anhydride, and itaconic acid, may be used as other radical copolymerizable monomers in a proportion of not more than 5% by weight. Usable radical polymerizable monomers additionally include alkyl (meth)acrylates, e.g., methyl (meth)acrylate, ethyl (meth)acrylate, butyl (meth)acrylate, 2-ethylhexyl (meth)acrylate, and stearyl (meth)acrylate; styrene and derivatives thereof; hydroxyalkyl (meth)acrylates, e.g., hydroxyethyl (meth)acrylate and hydroxypropyl (meth)acrylate; glycidyl-containing monomers, e.g., glycidyl acrylate and glycidyl methacrylate; amide compounds, e.g., acrylamide, methacrylamide, and N-methylolacrylamide; nitrogen-containing compounds, e.g., acrylonitrile, vinylpyridine, and vinylpyrrolidone; and polyalkylene glycol mono(meth)acrylates, e.g., polyethylene glycol monoacrylate and polypropylene glycol monomethacrylate. These monomers may be used either individually or in combination of two or more thereof.

Of the above-mentioned radical polymerizable monomers, alkyl acrylate monomer units having from 2 to 14 carbon atoms in the alkyl moiety thereof which endow the resulting polymer with adhesiveness may be present in the ethylene graft copolymer in a proportion of not more than 15% by weight. If the proportion of such monomer units exceeds 15% by weight, room-temperature non-adhesive characteristics required for hot-melt adhesives are impaired.

The ethylene graft copolymer having the above-specified structure is suitable for adhesion of a polyolefin-made adherend and materials made of resins other than polyolefins as stated above. Polyolefins as an adherend include ethylene homopolymers, e.g., high-density polyethylene, low-density polyethylene, linear low-density polyethylene, and very low-density polyethylene; copolymers of ethylene and an α,β-unsaturated carboxylic acid or a derivative thereof, e.g., EVA, ionomer resins, and an ethylene-ethyl acrylate copolymer; an ethylene-vinyl alcohol copolymer, polypropylene, chlorinated polypropylene, an ethylene-propylene copolymer rubber, and EPDM. Resins other than polyolefins include polystyrene, polyphenylene ether, polymethyl methacrylate, an ABS resin, polyvinyl chloride, polyamide, polyester, and polycarbonate.

The kind of ethylene graft copolymers to be used as a hot-melt adhesive is selected according to the kind of adherends. More specifically, graft copolymers comprising a polystyrene type macromonomer are preferably used for adhesion of polyolefin and polystyrene or polyphenylene ether; and those comprising a polymethyl methacrylate type macromonomer or a copoly(acrylonitrile/styrene) type macromonomer are preferably used for adhesion of polyolefin and polymethyl methacrylate, an ABS resin, polyvinyl chloride or polycarbonate.

Use of the ethylene graft copolymer of the present invention as a pressure-sensitive adhesive is described below. In recent years, adhesive tapes for packaging, adhesive labels, adhesive sheets for surface protection, and the like which comprise a support made of polyethylene, polypropylene or biaxially stretched polypropylene (hereinafter referred to OPP) having coated thereon a rubbery or acrylic pressure-sensitive adhesive in the form of a solution, an emulsion, or a hot-melt system have been widespread. In these adhesive products comprising a polyolefin as a support, adhesion of the adhesive to the support is generally weak so that the adhesive tends to be separated from the support and be transferred to an adherend.

An ethylene graft copolymer in which the polymer main chain comprises an ethylene monomer unit and an alkyl acrylate monomer unit as described below is suitable as a pressure-sensitive adhesive having excellent adhesion to such a polyolefin support and well-balance other physical properties required for adhesives, i.e., adhesion to an adherend and cohesive force, etc. More specifically, such an ethylene graft copolymer comprises from 20 to 50% by weight of an ethylene unit, from 20 to 70% by weight of a least one alkyl acrylate monomer unit containing from 2 to 14 carbon atoms in the alkyl moiety thereof, from 1 to 30% by weight of a macromonomer unit having a Tg of 20° C. or higher, and 0 to 20% weight of other radical polymerizable monomer units. The graft copolymer having such a structure will hereinafter be referred to as a pressure sensitive ethylene graft copolymer.

In the pressure sensitive ethylene graft copolymer, if the ethylene monomer unit is less than 20% by weight, the graft copolymer fails to manifest physical properties inherent to polyethylene and has poor adhesion to a support. If it exceeds 50% by weight, the graft copolymer has poor pressure-sensitive adhesiveness, and the balance of physical properties required for pressure-sensitive adhesives is destroyed.

If the proportion of the unit derived from at least one alkyl acrylate monomer containing from 2 to 14 carbon atoms in the alkyl moiety thereof, which constitutes the main chain of the graft copolymer in combination with an ethylene monomer unit, is less that 20% by weight, the pressure-sensitive adhesive has poor pressure-sensitive adhesiveness. If it exceeds 70% by weight, the relative content of the ethylene unit is too small, and adhesion to a polyolefin support is reduced. A preferred proportion of the alkyl acrylate monomer unit is from 25 to 60% by weight.

Examples of alkyl acrylate monomers having from 2 to 14 carbon atoms in the alkyl moiety thereof are ethyl acrylate, propyl acrylate, isopropyl acrylate, butyl acrylate, isobutyl acrylate, t-butyl acrylate, hexyl acrylate, octyl acrylate, 2-ethylhexyl acrylate, decanyl acrylate, and dodecanyl acrylate, with butyl acrylate and 2-ethylhexyl acrylate being particularly preferred.

If the proportion of the macromonomer unit in the pressure sensitive ethylene graft copolymer is less than 1% by weight, the graft copolymer has an insufficient cohesive force. If it exceeds 30% by weight, pressure-sensitive adhesiveness would be reduced. A preferred proportion of the macromonomer unit is from 2 to 20% by weight.

As stated above, macromonomers which can be preferably used for preparing the pressure sensitive ethylene graft copolymer are macromonomers whose polymer skeleton has a Tg of 20° C. or higher. Examples of such macromonomers are the same as those enumerated as raw materials for preparing ethylene graft copolymers for use as hot-melt adhesives.

Examples of other radical polymerizable monomers which can be used, if desired, for preparing the pressure sensitive ethylene graft copolymer are also the same as those enumerated as raw materials for hot-melt adhesives.

The pressure sensitive ethylene graft copolymer is useful not only as a raw material of various pressure-sensitive adhesive articles comprising polyethylene, polypropylene or OPP as a support, such as adhesive labels or stickers, double-coated tapes, packaging tapes, sealing tapes, masking tapes, and surface protecting sheets, but also as an adhesive of adhesive labels, double-coated tapes, adhesive tapes, etc. which are adhered to polyolefin adherends.

The present invention is now illustrated in greater detail by way of the following Examples, but it should be understood that the present invention is not deemed to be limited thereto. All parts, percents, and ratios are given by weight unless otherwise indicated.

EXAMPLES 1 TO 4

In a 3.8 l-metallic autoclave equipped with a stirrer whose atmosphere had been thoroughly displaced with nitrogen and ethylene were charged prescribed amounts of ethylene, n-hexane as a chain transfer agent, and a toluene solution of a radical polymerizable macromonomer having a styrene oligomer as a polymer skeleton and a methacryloyl group at the terminal thereof (hereinafter referred to as Macromonomer I) ("Macromonomer AS-6" produced by Toagosei Chemical Industry Co., Ltd.; number average molecular weight: 6,000) as a comonomer as shown in Table 1 below. Di-t-butyl peroxide was also charged therein as a polymerization initiator, and a polymerization reaction was conducted at a temperature of 170° C. and under a pressure of 1,600 kg/cm$^2$ for 1 hour.

A part of the produced polymer was dissolved in hot carbon tetrachloride, poured into a large amount of methyl ethyl ketone (hereafter abbreviated as MEK) to reprecipitate, and again washed with MEK, followed by vacuum drying at 70° C. overnight.

The thus purified polymer was identified as an ethylene graft copolymer according to the present invention by $^{13}$C-NMR analysis, infrared spectroscopic analysis, and elemental analysis.

The $^{13}$C-NMR analysis was carried out in an o-dichlorobenzene solution at 130° C. at a resonant frequency of 100 MHz. A copolymerization ratio was determined chiefly from an area ratio of the chemical shifts of the $^{13}$C-NMR spectrum. Taking the copolymer of Example 2 in Table 1 for an instance, the found values of the elemental analysis were carbon: 87.5% and hydrogen: 12.4%. These results agreed closely with the calculated values (carbon: 87.3%; hydrogen: 12.6%) which were obtained from the structure estimated from a ratio of a sum of the integrated values of peaks at 145 ppm, 41.5 ppm and 42.5 to 47 ppm (these peaks are assigned to a polystyrene unit) to a sum of the integrated values of peaks at 14 to 38 ppm (these peaks are assigned to a polyethylene unit and a polymethacrylate unit) observed in the $^{13}$C-NMR spectrum of the copolymer.

The infrared spectroscopic analysis was carried out on an about 500 μm thick sheet prepared by heat-press molding of the copolymer. Identification of the copolymer was made predominantly from whether or not an absorption at 1600 cm$^{-1}$ assigned to an aromatic ring was observed.

The content of the macromonomer "AS-6" in the copolymer as determined by relative comparison of an absorbance at 1600 cm$^{-1}$ also agreed very closely with the results of $^{13}$C-NMR and elemental analyses. These results are shown in Table 1.

Melt index (MI) and density of the resulting copolymer were measured according to JIS K 6760 and JIS K 7112, respectively.

COMPARATIVE EXAMPLE 1

In the same apparatus as used in Example 1 were charged 1700 g of ethylene, n-hexane as a chain transfer agent, and di-t-butyl peroxide as a polymerization initiator, and a polymerization reaction was conducted at a temperature of 170° C. and under a pressure of 1600 kg/cm$^2$ for 1 hour.

The resulting polymer was purified and analyzed in the same manner as in Example 1. The results obtained are shown in Table 1.

EXAMPLE 5

In the same apparatus as used in Example 1 were charged 1700 g of ethylene, a toluene solution of a radical polymerizable macromonomer having a methyl methacrylate oligomer as a polymer skeleton and a methacryloyl group at the terminal thereof (hereinafter referred to as Macromonomer II) ("Macromonomer AA-6" produced by Toagosei Chemical Industry Co., Ltd.; number average molecular weight: 6,000), n-hexane as a chain transfer agent, and ethyl acrylate as a vinyl monomer (hereinafter referred to as Vinyl Monomer I). Di-t-butyl peroxide was added thereto as a polymerization initiator, and a polymerization reaction was conducted at a temperature of 170° C. and under a pressure of 1600 kg/cm$^2$ for 1 hour.

The resulting polymer was purified and analyzed in the same manner as in Example 1. The results obtained are shown in Table 1. Quantitative determination of the macromonomer unit and ethyl acrylate unit in the copolymer was made by $^{13}$C-NMR and elemental analyses in the same manner as described in Example 1.

EXAMPLE 6

In the same apparatus as used in Example 1 were charged 1700 g of ethylene, a toluene solution of Macromonomer II, n-hexane as a chain transfer agent, and vinyl acetate as a vinyl monomer (hereinafter referred to as Vinyl Monomer II). Di-t-butyl peroxide was added thereto as a polymerization initiator, and a polymerization reaction was conducted at a temperature of 170° C. and under a pressure of 1600 kg/cm$^2$ for 1 hour.

The resulting polymer was purified and analyzed in the same manner as in Example 1. The results obtained are shown in Table 1. Quantitative determination of the macromonomer and vinyl acetate in the copolymer was made by $^{13}$C-NMR and elemental analyses in the same manner as described in Example 1.

TABLE 1

|  | Comp. Ex. 1 | Ex. 1 | Ex. 2 | Ex. 3 | Ex. 4 | Ex. 5 | Ex. 6 |
|---|---|---|---|---|---|---|---|
| Monomers: | | | | | | | |
| Ethylene (g) | 1700 | 1700 | 1700 | 1700 | 1700 | 1700 | 1700 |
| Macromonomer I[1] (g) | — | 10 | 45 | 100 | 100 | — | — |
| Macromonomer II[2] (g) | — | — | — | — | — | 30 | 30 |
| Vinyl Monomer I[3] (g) | — | — | — | — | — | 30 | — |
| Vinyl Monomer II[4] (g) | — | — | — | — | — | — | 120 |
| Chain Transfer Agent[5] (g) | 450 | 300 | 350 | 230 | 180 | 170 | 170 |
| Comonomer Solvent[6] (g) | — | 60 | 165 | 360 | 360 | 100 | 100 |
| Radical Generator[7] (mg) | 2.92 | 2.92 | 2.92 | 2.92 | 4.84 | 11.7 | 14.6 |
| Produced Polymer: | | | | | | | |
| Yield (g) | 288 | 235 | 200 | 266 | 276 | 290 | 236 |
| MI (g/10 min) | 1.8 | 0.41 | 1.9 | 6.0 | 2.9 | 2.9 | 2.9 |
| Density (g/cm$^3$) | 0.926 | 0.936 | 0.943 | 0.954 | 0.953 | 0.935 | 0.934 |
| Monomer Unit Content (wt %): | | | | | | | |
| Macromonomer | 0 | 6.4 | 24.1 | 34.2 | 33.0 | 15.8 | 16.5 |
| Vinyl Monomer I | — | — | — | — | — | 20.0 | — |
| Vinyl Monomer II | — | — | — | — | — | — | 4.0 |

Note:
[1] Radical polymerizable macromonomer "AS-6"
[2] Radical polymerizable macromonomer "AA-6"
[3] Ethyl acrylate
[4] Vinyl acetate
[5] n-Hexane
[6] Toluene
[7] Di-t-butyl peroxide

COMPARATIVE EXAMPLES 2 TO 4

Comparative Examples 2 to 4 are concerned with grafting of a (poly)styrene group to polyethylene. Introduction of a styrene group was accomplished by grafting a styrene oligomer having a carboxyl group at one terminal thereof ("Macromonomer MC-5T" produced by Toagosei Chemical Industry Co., Ltd.; average molecular weight: 5,200; acid value: 0.134 mg/g) to a polyethylene copolymer having an epoxy group per molecule under the following conditions.

Comparative Example 2

Seventy parts of ethylene-glycidyl methacrylate copolymer (hereinafter abbreviated as E-GMA) ("NISSEKI REXPEAR 3150" produced by Nippon Petrochemicals Co., Ltd.; MFR: 3; glycidyl methacrylate content: 15%) and 30 parts of the above-described carboxyl-terminated macromonomer were kneaded in a mixing type Brabender Plastograph at 160° C. for 20 minutes to effect grafting.

Comparative Example 3

Grafting was conducted in the same manner as in Comparative Example 2, except for adding 300 ppm of triphenylphosphine to the reaction system for the purpose of accelerating the reaction between the epoxy group and the carboxyl group.

Comparative Example 4

The same kinds and amounts of an ethylene copolymer and a macromonomer as used in Comparative Examples 2 or 3 were reacted in a homogeneous phase in hot xylene at a boiling point of xylene for 1 hour.

For purification, each of the resulting grafted copolymers was ground to the size of 20 mesh pass, extracted and washed three times with tetrahydrofuran at room temperature to remove the unreacted macromonomer, and dried in vacuo at 70° C. overnight.

The macromonomer content in the resulting graft copolymer was determined by infrared spectroscopic analysis based on absorption at 1600 cm$^{-1}$ assigned to an aromatic ring. The results obtained are shown in Table 2.

TABLE 2

|  | Grafted Macromonomer Content (%) |
| --- | --- |
| Comparative Ex. 2 | 3.3 |
| Comparative Ex. 3 | 4.0 |
| Comparative Ex. 4 | 3.0 |

It can be seen from Tables 1 and 2 that the styrene content in the copolymers of Comparative Examples 2 to 4, in which styrene introduction was effected by utilizing a polymerization reaction, is considerably lower than that obtained by the process of the present invention.

EXAMPLE 7

A polymerization reaction was carried out in the same manner as in Example 1, except for changing the amount of Macromonomer I to 8 g, to obtain an ethylene graft copolymer having an ethylene content of 94.8% and a styrene content of 5.2%.

Thirty parts of the resulting graft copolymer, 30 parts of polyethylene ("F-019" produced by Ube Industries, Ltd.), and 40 parts of a polyphenylene ether resin ("NORYL 534 J" produced by Engineering Plastic K.K.) were melt-blended and pelletized in a vented twin-screw extruder (unidirectional revolution; screw diameter: 29 mm; L/D: 25) at a resin temperature of 190° to 200° C. to obtain a resin composition.

The pellets were press molded at 190° C. to prepare tensile specimens, and tensile test was conducted at a rate of pulling of 10 mm/min according to JIS K 7113. As a result, the composition was found to have a tensile strength of 164 kg/cm$^2$ and an elongation at break of 35%.

Further, a resin composition prepared from 60 parts of the graft copolymer and 40 parts of NORYL 534 J was found to have a tensile strength of 182 kg/cm$^2$ and an elongation at break of 70%.

For reference, a resin composition comprising 60 parts of the above-described polyethylene and 40 parts of NORYL 534 J had a tensile strength of 85 kg/cm$^2$ and an elongation at break of 14%.

EXAMPLE 8

A polymerization reaction was carried out in the same manner as in Example 1, except for replacing the toluene solution of Macromonomer I with 200 g of a toluene solution containing 10 g of Macromonomer II and changing the amount of n-hexane to 100 g, to obtain an ethylene graft copolymer having an ethylene content of 93.5% and a methyl methacrylate content of 4.7%.

A resin composition comprising 30 parts of the resulting graft copolymer, 30 parts of polyethylene "F-019", and 40 parts of an ABS resin ("TUFREX 461" produced by Mitsubishi Monsant Chemical Co., Ltd.) was found to have a tensile strength of 128 kg/cm$^2$ and an elongation at break of 24% as determined in the same manner as in Example 7.

Further, a resin composition comprising 60 parts of the graft copolymer and 40 parts of TUFREX 461 was found to have a tensile strength of 141 kg/cm$^2$ and an elongation at break of 52%.

For reference, a resin composition comprising 60 parts of the polyethylene "F-019" and 40 parts of the ABS resin "TUFREX 461" had a tensile strength of 67 kg/cm$^2$ and an elongation at break of 8.4%.

EXAMPLE 9

A polymerization reaction was carried out in the same manner as in Example 8, except for replacing Macromonomer II with a styrene-acrylonitrile copolymer having a methacryloyl group at the terminal thereof (hereinafter referred to as Macromonomer III) ("Macromonomer AN-6" produced by Toa Gosei Chemical Industry Co., Ltd.), to obtain an ethylene graft copolymer having an ethylene content of 94.5%.

A resin composition comprising 60 parts of the resulting graft copolymer and 40 parts of an ABS resin "TUFREX 461" was found to have a tensile strength of 148 kg/cm$^2$ and an elongation at break of 45% as determined in the same manner as in Example 7.

EXAMPLE 10 AND COMPARATIVE EXAMPLE 5

A polymerization reaction was carried out in the same manner as in Example 1, except for additionally using 30 g of glycidyl methacrylate as a vinyl monomer and changing the amount of n-hexane to 150 g, to obtain an ethylene graft copolymer having an ethylene content of 86.0%, a glycidyl methacrylate content of 10.5%, and a styrene content of 3.5%.

The resulting graft copolymer, polyamide-6 (PA-6), an ethylene-glycidyl methacrylate copolymer (E-GMA), and glass fiber were melt-kneaded at a ratio shown in Table 3 below in a twin-screw extruder (unidirectional revolution; screw diameter: 30 mm) at a cylinder temperature of 230° C. to obtain a resin composition as pellets.

The pellets were injection molded at a cylinder temperature of 240° C. and a mold temperature of 70° C. to prepare an unnotched specimen (13 mm×65 mm×6 mm) for Izod impact test and a specimen (13 mm×220 mm×6 mm) for tensile test.

The Izod impact strength and tensile strength at 25° C. of the resin composition were determined according to ASTM-D-256 and ASTM-D-638, respectively.

Further, a specimen was soaked in water at 23° C. for 25 days and then allowed to stand at 23° C. at 65% RH for 1 day. The change of weight was determined to obtain a water absorption (%).

The results of these measurements are shown in Table 3.

TABLE 3

| Run No. | PA-6 (part) | Graft Copolymer (part) | E-GMA (part) | Glass Fiber (part) | Izod Impact Strength (kg-cm/cm) | Tensile Strength (kg/cm$^2$) | Water Absorption (%) | Remark |
|---|---|---|---|---|---|---|---|---|
| 1 | 95 | 5 | — | — | 72 | 830 | 1.9 | Invention |
| 2 | 90 | 10 | — | — | 85 | 820 | 1.7 | " |
| 3 | 80 | 20 | — | — | no break | 805 | 1.4 | " |
| 4 | 70 | 30 | — | — | " | 795 | 1.2 | " |
| 5 | 80 | 20 | — | 30 | 11.0 | 920 | — | " |
| 6 | 100 | — | — | — | no break | 790 | 2.3 | Comparison |
| 7 | 90 | — | 10 | — | " | 720 | 2.2 | " |
| 8 | 80 | — | 20 | — | " | 660 | 2.3 | " |
| 9 | 70 | — | 30 | — | " | 575 | 2.3 | " |

Further, the above-prepared graft copolymer, polyethylene terephthalate (PET), an ethylene-glycidyl methacrylate copolymer (E-GMA), glass fiber, etc. were melt-mixed and pelletized in a twin screw extruder (unidirectional revolution; screw diameter: 30 mm) at a cylinder temperature of 260° C.

The pellets were injection molded at a cylinder temperature of 280° C. and a mold temperature of 20° C. to prepare a notched specimen (13 mm×65 mm×6 mm) for Izod impact test at 25° C. and a specimen (13 mm×130 mm×6 mm) for heat distortion test under a load of 18.6 kg/cm$^2$. Izod impact strength (notched) and a heat distortion temperature of the resin composition were measured according to JIS K 7110 and ASTM-D-648, respectively. The results obtained are shown in Table 4.

TABLE 4

| Run No. | PET (part) | Graft Copolymer (part) | E-GMA (part) | Glass Fiber (part) | Talc (part) | Calcium Stearate (part) | Izod Impact Strength (kg-cm/cm) | Heat Distortion Temperature (°C.) | Remark |
|---|---|---|---|---|---|---|---|---|---|
| 10 | 95 | 5 | — | — | — | — | 4.5 | 84 | Invention |
| 11 | 90 | 10 | — | — | — | — | 6.2 | 82 | " |
| 12 | 80 | 20 | — | — | — | — | 9.8 | 79 | " |
| 13 | 70 | 30 | — | — | — | — | 13.5 | 74 | " |
| 14 | 80 | 20 | — | 30 | 1 | 0.5 | 12.0 | 210 | " |
| 15 | 100 | — | — | — | — | — | 2.6 | 84 | Comparison |
| 16 | 90 | — | 10 | — | — | — | 5.2 | 73 | " |
| 17 | 80 | — | 20 | — | — | — | 7.3 | 67 | " |
| 18 | 70 | — | 30 | — | — | — | 13.2 | 55 | " |

Further, the above-prepared graft copolymer, a polycarbonate resin (PC) ("Novalex 7025 A" produced by Mitsubishi Chemical Industries, Ltd.), an ethylene-glycidyl methacrylate copolymer (E-GMA), and glass fiber were melt-kneaded and pelletized in a twin screw extruder (unidirectional revolution; screw diameter: 30 mm) at a cylinder temperature of 250° C. The pellets were dried at 130° C. for 3 hours.

The pellets were injection molded at a cylinder temperature of 280° C. and a mold temperature of 95° C. to prepare a notched specimen (13 mm×65 mm×6 mm or 3 mm) for Izod impact test at 25° C. and a specimen (13 mm×220 mm×6 mm) for impact strength test at 25° C. Izod impact strength, tensile strength, and tensile elongation at 25° C. were measured according to ASTM-D-256, ASTM-D-638, and ASTM-D-638, respectively. The results obtained are shown in Table 5. In Table 5, the Izod impact strength values in parentheses are those of specimens of 3 mm in thickness.

TABLE 5

| Run No. | PC (part) | Graft Copolymer (part) | E-GMA (part) | Glass Fiber (part) | Izod Impact Strength (kg-cm/cm) | Tensile Strength (kg/cm$^2$) | Tensile Elongation (%) | Remark |
|---|---|---|---|---|---|---|---|---|
| 19 | 95 | 5 | — | — | 30 (90) | 550 | 85 | Invention |
| 20 | 90 | 10 | — | — | 47 (85) | 510 | 70 | " |
| 21 | 80 | 20 | — | — | 65 (78) | 470 | 53 | " |
| 22 | 70 | 30 | — | — | 59 (70) | 440 | 35 | " |
| 23 | 80 | 20 | — | 30 | 13 | 1000 | 3 | " |
| 24 | 100 | — | — | — | 14 (98) | 650 | 2 | Comparison |
| 25 | 90 | — | 10 | — | 65 (104) | 500 | 60 | " |
| 26 | 80 | — | 20 | — | 85 (93) | 420 | 105 | " |
| 27 | 70 | — | 30 | — | 86 (90) | 390 | 120 | " |

Further, the above-prepared graft copolymer, a polarylene sulfide resin (PPS) ("TOHPREN PPS T-1" produced by Tohpren Co., Ltd.), an ethylene-glycidyl methacrylate copolymer (E-GMA), and glass fiber were melt-kneaded and pelletized in a twin screw extruder (unidirectional revolution; screw diameter: 30 mm) at a cylinder temperature of 280° C. The pellets were dried at 130° C. for 3 hours.

The pellets were injection molded at a cylinder temperature of 310° C. and a mold temperature of 130° C. to prepare an unnotched specimen (13 mm×65 mm×6 mm) for Izod impact test and a specimen (13 mm×220 mm×6 mm) for tensile test. Izod impact strength, tensile strength, and tensile elongation at 25° C. were measured in the same manner as used for the polycarbonate resin compositions. The results obtained are shown in Table 6.

TABLE 6

| Run No. | PPS (part) | Graft Copolymer (part) | E-GMA (part) | Glass Fiber (part) | Izod Impact Strength (kg-cm/cm) | Tensile Strength (kg/cm$^2$) | Tensile Elongation (%) | Remark |
|---|---|---|---|---|---|---|---|---|
| 28 | 95 | 5 | — | — | 18 | 480 | 2 | Invention |
| 29 | 90 | 10 | — | — | 25 | 450 | 10 | " |
| 30 | 80 | 20 | — | — | 55 | 420 | 25 | " |
| 31 | 70 | 30 | — | — | 62 | 350 | 35 | " |
| 32 | 80 | 20 | — | 30 | 28 | 1300 | 2 | " |
| 33 | 100 | — | — | — | 15 | 500 | 1.5 | Comparison |
| 34 | 90 | — | 10 | — | 20 | 480 | 12 | " |
| 35 | 80 | — | 20 | — | 45 | 400 | 25 | " |
| 36 | 70 | — | 30 | — | 60 | 350 | 38 | " |

EXAMPLE 11 a) Preparation of Macromonomer:

In a glass-made flask equipped with a stirrer, a reflux condenser, a dropping funnel, an inlet for introducing a gas, and a thermometer were charged 50 parts of t-butyl methacrylate, 2.5 parts of mercaptoacetic acid, and 50 parts of toluene. A solution comprising 100 parts of t-butyl methacrylate, 100 pats of toluene, and 1.5 parts of azobisisobutyronitrile was put in the dropping funnel. After the inner temperature was elevated to 90° C., the solution in the dropping funnel was added dropwise to the mixture over 3 hours. The mixture was allowed to react for 4 hours to obtain a carboxyl-terminated prepolymer. To the prepolymer solution were added 4.3 parts of glycidyl methacrylate, 1.5 parts of a quaternary ammonium salt, and 0.06 part of hydroquinone monomethyl ether, and the mixture was allowed to react at 90° C. for 8 hours while bubbling air. The reaction conversion was found to be 99.0% as calculated from the acid value of the reaction solution.

The solvent was removed from the reaction mixture by vacuum drying to obtain 143 parts of a solid macromonomer having a t-butyl methacrylate unit as a polymer skeleton (hereinafter referred to as Macromonomer (IV)).

The resulting macromonomer was found to have a number average molecular weight (Mn) of 5,800 and a weight average molecular weight of 12,000 as determined by GPC.

b) Preparation of Graft Copolymer:

A polymerization reaction was carried out in the same manner as in Example 1, except for replacing the toluene solution of Macromonomer I with 100 g of a toluene solution containing 50 g of Macromonomer IV and changing the amount of n-hexane to 100 g, to obtain an ethylene graft copolymer.

The resulting ethylene graft copolymer was dried, and the product was subjected to thermal analysis by means of a differential scanning calorimeter (TG-DSC). As a result, an endothermic peak ascribed to fusion of the polyethylene crystal portion and an endothermic peak ascribed to decomposition of the t-butyl ester were observed in the vicinity of 125° C. and 250° C., respectively. From the weight loss which concomitantly occurred with the latter endothermic reaction, the t-butyl methacrylate content in the ethylene graft copolymer was found to be 2.3%.

Thirty-five parts of the resulting graft copolymer and 70 parts of nylon-6 ("Nylon 1013 B" produced by Ube Industries, Ltd.) were dry-blended and melt-kneaded in a vented twin-screw extruder (unidirectional revolution; screw diameter: 29 mm; L/D: 25) at a resin temperature of 270° C. to obtain a resin composition as pellets.

The resulting resin composition was evaluated with respect to (1) MI (measured at 240° C. under a load of 2.16 kg in accordance with JIS K 7210), (2) tensile strength (measured on a specimen prepared by press molding of the pellets, followed by mechanical processing, at a rate of pulling of 10 mm/min according to JIS K 7113), (3) notched Charpy impact strength (measured according to JIS K 7111), and (4) diameter of dispersed particles (the rupture cross-section after Charpy impact test was observed with a scanning electron microscope). The results of these evaluations were as follows.

MI: 7.1 g/10 min
Tensile Strength: 330 kg/cm$^2$
Elongation at Break: 50%
Impact Strength: 12.2 kg-cm/cm$^2$
Diameter of Dispersed Particles: 0.2 to 2 μm Further, a resin composition was prepared from 30 parts of the graft copolymer and 70 parts of polybutylene terephthalate having an MI of 18 g/10 min and an impact strength of 2.1 kg.cm/cm$^2$ in the same manner as described above. The resulting resin composition had an impact strength of 7 kg.cm/cm$^2$.

COMPARATIVE EXAMPLE 6

The same nylon-6 as used in Example 11 had the following physical properties.

MI: 39 g/10 min
Tensile Strength: 477 kg/cm$^2$
Elongation at Break: 180%
Impact Strength: 8.9 kg.cm/cm$^2$

COMPARATIVE EXAMPLE 12

A polymerization reaction was carried out in the same manner as in Example 1, except for using 100 g of n-hexane and 700 g of a toluene solution containing 350 g of Macromonomer (IV) to obtain an ethylene graft copolymer.

The resulting graft copolymer was dried and subjected to TG-DSC. As a result, the graft copolymer showed the similar behavior to that observed with the copolymer of Example 11. A t-butyl methacrylate content in the copolymer was found to be 15.4%.

The graft copolymer, nylon-6 ("Nylon 1013 B"), and polyethylene ("Rexlon F41 N" produced by Nippon Petrochemicals Co., Ltd.) were melt-blended and pelletized at a ratio shown in Table 7 below in a vented twin-screw extruder (unidirectional revolution; screw diameter: 29 mm; L/D: 25) at a resin temperature of 270° C. to obtain a resin composition.

Physical properties of each of the resulting resin compositions were determined in the same manner as in Example 11. In addition, the appearance of the specimen was evaluated by visual observation. The results obtained are shown in Table 7.

TABLE 7

|  | Run No. 37 | Run No. 38 | Run No. 39 | Run No. 40 |
|---|---|---|---|---|
| Composition (part): | | | | |
| Nylon-6 | 70 | 70 | 40 | 40 |
| Polyethylene | 30 | 30 | 60 | 60 |
| Graft copolymer | 2 | 5 | 2 | 5 |
| Physical Properties: | | | | |
| MI (g/10 in) | 17.6 | 6.4 | 6.7 | 4.1 |
| Tensile Strength (kg/cm$^2$) | 323 | 327 | 124 | 130 |
| Elongation at Break (%) | 27 | 47 | 30 | 35 |
| Impact Strength (kg · cm/cm$^2$) | 6.1 | 11.8 | 6.4 | 17.2 |
| Dispersed Particle Diameter ($\mu$m) | 0.5–3 | 0.2–2 | 0.5–1.5 | 0.2–0.5 |

A resin composition prepared in the same manner as in Run No. 37, except for replacing nylon-6 with polybutylene terephthalate having an MI of 18 g/10 min and an impact strength of 2.1 kg.cm/cm$^2$, had an impact strength of 6 kg.cm/cm$^2$.

EXAMPLE 13

A polymerization reaction was carried out in the same manner as in Example 1, except for using prescribed amounts of materials shown in Table 8 below to obtain an ethylene graft copolymer.

The graft copolymer obtained in Run No. 41 of Table 8 had an ethylene content of 83.6% and a macromonomer content of 16.4%, and the results of elemental analysis of this copolymer were C: 86.3%, and H: 13.7%. Copolymerization ratios of other copolymers are shown in Table 8.

MI and density of each copolymer were determined according to JIS K 6760 and JIS K 7112, respectively. Further, adhesion characteristics of each copolymer were evaluated according to the following test methods. The results of these measurements are also shown in Table 8.

a) Tensile Shear Strength:

Test pieces of 2 mm (t)×25 mm (w) produced by Nippon Test Panel K.K. were used. The graft copolymer melted by heating at 150° to 160° C. was coated on a polyethylene test piece by means of a bar coater to form a 0.1 mm thick adhesive layer. Another test piece was put thereon to an adhesion area of 25 mm×25 mm, and a pressure of about 100 g/cm$^2$ was applied for bonding. After conditioning at 25° C. and 65% RH for 24 hours, the test pieces were pulled at a rate of 50 mm/min.

b) 180° Peel Strength:

Test pieces were adhered in the same manner as in (a) above, except for using 100 $\mu$m thick polyethylene films as adherends. After conditioning under the same conditions as in (a) above, the films were peeled at an angle of 180° at a rate of pulling of 300 mm/min.

TABLE 8

|  | Run No. 41 | Run No. 42 | Run No. 43 | Run No. 44 | Run No. 45 |
|---|---|---|---|---|---|
| Polymerization System (part): | | | | | |
| Ethylene | 1700 | 1700 | 1700 | 1700 | 1700 |
| Macromonomer | AS-6 25 | AS-6 100 | AS-6 30 | Chemlink 4500[1] 50 | AA-6 50 |
| Other Monomer | — | — | — | — | methacrylic acid 5 |
| n-Hexane | 300 | 230 | 300 | 300 | 200 |
| Toluene | 60 | 360 | 60 | 200 | 250 |
| Di-t-Butyl Peroxide | 2.9 | 2.9 | 2.9 | 2.9 | 12.3 |
| Graft Copolymer Produced: | | | | | |
| Yield (part) | 235 | 266 | 280 | 245 | 241 |
| Ethylene Content (%) | 83.6 | 66.6 | 87.9 | 78.0 | 73.6 |
| Macromonomer Content (%) | 16.4 | 33.4 | 12.1 | 22.0 | 23.3 |
| Other Monomer Content (%) | — | — | — | — | 3.1 |
| Physical Properties: | | | | | |
| MI (g/10 min) | 0.4 | 6.0 | 1.2 | 3.8 | 3.0 |
| Density (g/cm$^3$) | 0.936 | 0.954 | 0.939 | 0.940 | 0.942 |
| Adhesion Characteristics: | | | | | |
| Adherend | PE[2]/PS[3] | PE/PS | PE/PMMA[3] | PE/PPO[4] | PE/PVC[5] |
| Tensile Shear Strength (kg/cm$^2$) | 58.8 | 62.0 | 48.5 | 55.6 | 53.3 |
| 180° Peel Strength (kg/in) | 3.3 | 4.1 | 3.6 | 3.0 | 5.0 |

Note:
[1] Polystyrene type macromonomer (number average molecular weight: 13,000) produced by Sartomer Inc.
[2] Polyethylene
[3] Polystyrene
[4] Polymethyl methacrylate
[5] Polyphenylene oxide
[6] Polyvinyl chloride Adhesion characteristics of the graft copolymer of Run No. 45 were evaluated in the manner already described, except for using polyethylene and aluminum as adherends. As a result, tensile shear strength and peel strength were 68.0 kg/cm$^2$ and 5.5 kg/in, respectively.

COMPARATIVE EXAMPLE 7

Adhesion characteristics of a commercially available ethylene-vinyl acetate hot melt adhesion having a vinyl acetate content of 28% (MI: 6 g/10 min; density: 0.95 g/cm$^3$) were evaluated in the manner already described, except for using, as adherends, polyethylene and polystyrene (Run No. 46) or polyethylene and polymethyl methacrylate (Run No. 47). The results obtained are shown in Table 9 below.

TABLE 9

|  | Run No. 46 | Run No. 47 |
|---|---|---|
| Tensile Shear Strength (kg/cm$^2$) | 16.5 | 15.3 |

TABLE 9-continued

|  | Run No. 46 | Run No. 47 |
|---|---|---|
| Peel Strength (kg/in) | 1.8 | 1.2 |

EXAMPLE 14

A polymerization reaction was carried out in the same manner as in Example 1, except for using prescribed amounts of materials shown in Table 10 below to obtain an ethylene graft copolymer.

For purification, a part of the produced graft copolymer was dissolved in hot carbon tetrachloride, poured into a large quantity of MEK to reprecipitate, further washed with MEK, and dried in vacuo at 70° C. overnight.

The purified graft copolymer was analyzed by $^{13}$C-NMR, infrared spectrophotometry, and elemental analysis to confirm the composition thereof. The results obtained are shown in Table 10. In Run No. 48, the $^{13}$C-NMR spectrum of the graft copolymer showed signals assigned to a polystyrene unit at 145 ppm, 41.5 ppm and 42.5 to 47 ppm; signals assigned to an ethylene unit and a butyl acrylate unit at 10 to 40 ppm; and signals assigned to a carbonyl carbon of a butyl acrylate unit at about 170 ppm. Based on the integrated intensity of these signals, the copolymer was found to have an ethylene content of 30.3%, a butyl acrylate content of 63.1%, and a macromonomer content of 6.6%. The results of elemental analysis of the copolymer were C: 73.5%; H: 10.7%; and O: 15.8%.

An organic solvent solution of each of the resulting graft copolymers was coated on a 60 μm-thick OPP film (non-treated) to a thickness of 30 μm and dried to obtain an adhesive film. A silicone release sheet was superposed thereon and cut to a size to prepare an adhesion test piece. Adhesion characteristics were evaluated in terms of tack, adhesive strength, and retention of adhesion according to the following test methods. The results obtained are shown in Table 10.

c) Tack:

Ball tack was measured by a J. Dow method at 25±1° C. and 65±1% RH.

d) Adhesive Strength:

The adhesive film was cut to a width of 25 mm, and the adhesive strip was adhered to a stainless steel plate and pressed by a stroke of a 2 kg rubber roller. Adhesive strength was measured by peel test at a peel angle of 180° and at a rate of pulling of 300 mm/min according to JIS Z 0273.

e) Retention of Adhesion:

The adhesive film was adhered to a stainless steel plate over an adhesion area of 25 mm×25 mm, and a load of 1 kg was applied at 40° C. The time required for the load to drop was measured.

TABLE 10

|  | Run No. 48 | Run No. 49 | Run No. 50 | Run No. 51 |
|---|---|---|---|---|
| Polymerization System (part): |  |  |  |  |
| Ethylene | 1700 | 1700 | 1700 | 1700 |
| Alkyl Acrylate | BA[1] | HA[2] | HA | HA |
| Macromonomer | 100 AS-6 | 130 AN-6[3] | 110 AA-6 | 130 AS-6 |
| Other Monomer | 13 — | 10 — | 55 — | 25 Acrylic Acid 3 |
| n-Hexane | 250 | 300 | 250 | 250 |
| Toluene | 100 | 100 | 250 | 150 |
| Di-t-Butyl Peroxide | 0.94 | 0.94 | 0.96 | 0.95 |
| Polymer Produced: |  |  |  |  |
| Yield (part) | 210 | 203 | 260 | 220 |
| Ethylene Content (%) | 30.3 | 40.8 | 34.9 | 30.9 |
| Alkyl Acrylate Content (%) | 63.1 | 55.0 | 42.2 | 56.2 |
| Macromonomer Content (%) | 6.6 | 4.2 | 22.9 | 10.9 |
| Other Monomer Content (%) | — | — | — | 2.0 |
| Adhesion Characteristics: |  |  |  |  |
| Tack | 8 | 8 | 5 | 6 |
| Adhesive Strength (g/25 mm) | 450 | 570 | 590 | 910 |
| Retention of Adhesion | 60 mins. with 0.1 mm slip | 60 mins. with 0.1 mm slip | 60 mins. with no slip | 60 mins. with no slip |

Note:
[1] Butyl acrylate
[2] 2-Ethylhexyl acrylate
[3] Copoly(styrene-acrylonitrile)type macromonomer produced by Toagosei Chemical Industry Co., Ltd.; number average molecular weight: 6,300

While the invention has been described in detail and with reference to specific embodiments thereof, it will be apparent to one skilled in the art that various changes and modifications can be made therein without departing from the spirit and scope thereof.

What is claimed is:

1. An ethylene graft copolymer which is obtained by radical polymerization of a monomer composition comprising (A) from 50 to 99.95% by weight of ethylene, (B) from 0.05 to 50% by weight of a macromonomer having a number average molecular weight of from 2,000 to 20,000 and having a (meth)acryloyl group only at one terminal of the molecular chain thereof, and (C) 0 to 49.95% by weight of at least one other radical polymerizable monomer, wherein the radical polymerization is carried out at a temperature of from 50° to 400° C. and at a pressure of from 500 to 4,000 kg/cm$^2$.

2. An ethylene graft copolymer as claimed in claim 1, wherein said ethylene graft copolymer has a melt index of from 0.01 to 100 g/10-min and a molecular weight distribution Mw/Mn of from 1.0 to 20.0.

3. A molding resin composition comprising (i) an ethylene graft copolymer which is obtained by radical polymerizing of a monomer composition comprising (A) from 50 to 99.95% by weight of ethylene, (B) from 0.05 to 50% by weight of a macromonomer having a number average molecular weight of from 2,000 to 20,000 and having a (meth)acryloyl group only at one terminal of the molecular chain thereof, and (C) 0 to 49.95% by weight of at least one other radical polymerizable monomer wherein the radical polymerization is carried out at a temperature of from 50° to 400° C. and at a pressure of from 500 to 4,000 kg/cm$^2$, and (ii) a resin selected from the group consisting of polyamide, polyester, polyphenylene ether, an ABS resin, polycarbonate, and polyphenylene sulfide.

* * * * *